United States Patent
Krishan et al.

(10) Patent No.: US 12,192,351 B2
(45) Date of Patent: Jan. 7, 2025

(54) METHODS, SYSTEMS, AND COMPUTER READABLE MEDIA FOR SHARING KEY IDENTIFICATION AND PUBLIC CERTIFICATE DATA FOR ACCESS TOKEN VERIFICATION

(71) Applicant: Oracle International Corporation, Redwood Shores, CA (US)

(72) Inventors: Rajiv Krishan, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 292 days.

(21) Appl. No.: 17/536,021

(22) Filed: Nov. 27, 2021

(65) Prior Publication Data
US 2023/0171099 A1    Jun. 1, 2023

(51) Int. Cl.
*H04L 29/00*     (2006.01)
*H04L 9/08*      (2006.01)
*H04L 9/32*      (2006.01)

(52) U.S. Cl.
CPC .......... *H04L 9/0891* (2013.01); *H04L 9/3247* (2013.01); *H04L 9/3263* (2013.01)

(58) Field of Classification Search
CPC ... H04L 9/0891; H04L 9/3247; H04L 9/3263; H04L 9/3234; H04W 12/0431; H04W 12/069; H04W 12/108
See application file for complete search history.

(56) References Cited

U.S. PATENT DOCUMENTS 8,054,722 B2 * 11/2011 Xu .......................... G06F 21/80
                                                          369/59.1
8,254,143 B2 *  8/2012 Du ....................... H05K 7/1439
                                                           439/43

(Continued)

FOREIGN PATENT DOCUMENTS

CN    103812697 B  * 12/2017
EP      3570515 A1    11/2019

(Continued)

OTHER PUBLICATIONS

Advisory Action for U.S. Appl. No. 17/115,746 (Sep. 27, 2023).

(Continued)

*Primary Examiner* — Don G Zhao
(74) *Attorney, Agent, or Firm* — Jenkins, Taylor & Hunt, P.A.

(57) ABSTRACT

A method for sharing key identification (key ID) and public certificate data for access token verification comprises, at a network function (NF) repository function (NRF) including at least one processor, receiving, from a producer NF, an NF registration message including key ID version information. In response to detecting the key ID version information, sending, to the producer NF, an NF registration response message including a current key ID version value, at least one digital certificate, and at least one corresponding public key to the producer NF. The method further includes receiving, from the producer NF, an NF update message that includes the current key ID version value and in response to determining that the current key ID version value in the NF update message does not match an updated key ID version value maintained at the NRF, sending an NF update response message that the updated key ID version value, at least one updated digital certificate, and at least one corresponding updated public key to the producer NF.

20 Claims, 7 Drawing Sheets

(56) References Cited

U.S. PATENT DOCUMENTS

| | | | | |
|---|---|---|---|---|
| 8,509,239 B2* | 8/2013 | Zhu | H04L 67/10 | 370/392 |
| 8,711,864 B1* | 4/2014 | Ko | H04L 12/4633 | 709/221 |
| 8,769,287 B2* | 7/2014 | Huang | H04L 9/3073 | 713/182 |
| 8,811,372 B2* | 8/2014 | Li | H04W 56/002 | 370/324 |
| 8,824,449 B2* | 9/2014 | van der Wateren | H04J 3/0655 | 370/350 |
| 8,880,891 B2* | 11/2014 | Liu | H04L 63/0869 | 713/176 |
| 8,990,936 B2* | 3/2015 | Jiang | H04L 69/22 | 726/22 |
| 9,866,392 B1* | 1/2018 | Campagna | H04L 9/14 | |
| 10,193,700 B2* | 1/2019 | Liu | H04W 12/069 | |
| 10,299,128 B1* | 5/2019 | Suthar | H04L 9/30 | |
| 10,595,256 B1* | 3/2020 | Marupaduga | H04W 36/26 | |
| 10,609,154 B2* | 3/2020 | Talebi Fard | H04W 48/18 | |
| 10,791,044 B1* | 9/2020 | Krishan | H04L 43/50 | |
| 10,833,938 B1* | 11/2020 | Rajput | H04L 67/1095 | |
| 11,023,585 B1* | 6/2021 | Light | G06F 21/577 | |
| 11,316,670 B2* | 4/2022 | Stahl | H04W 12/50 | |
| 11,425,636 B1 | 8/2022 | Aggarwal et al. | | |
| 11,503,031 B1* | 11/2022 | Hu | H04L 9/3242 | |
| 11,895,501 B2 | 2/2024 | Rajput et al. | | |
| 2008/0144824 A1* | 6/2008 | Stewart | H04M 7/123 | 380/257 |
| 2008/0155068 A1* | 6/2008 | Newman | H04L 67/34 | 709/220 |
| 2008/0229110 A1* | 9/2008 | Balfanz | H04L 9/3263 | 713/176 |
| 2008/0229402 A1* | 9/2008 | Smetters | H04L 63/0853 | 726/9 |
| 2008/0317042 A1* | 12/2008 | Balfanz | G06F 8/436 | 370/395.53 |
| 2009/0296706 A1* | 12/2009 | Zhang | H04L 61/2532 | 370/389 |
| 2009/0316572 A1* | 12/2009 | Zhang | H04L 45/00 | 370/220 |
| 2009/0319985 A1* | 12/2009 | Sun | G06F 9/451 | 717/106 |
| 2009/0323536 A1* | 12/2009 | Liu | H04L 63/30 | 370/241 |
| 2009/0327688 A1* | 12/2009 | Li | G06F 21/566 | 713/100 |
| 2010/0005181 A1* | 1/2010 | Zhang | H04L 63/102 | 726/1 |
| 2010/0005514 A1* | 1/2010 | Chen | G06F 21/6218 | 726/4 |
| 2010/0049932 A1* | 2/2010 | Tan | G06F 11/1461 | 711/E12.001 |
| 2010/0121992 A1* | 5/2010 | Chen | G06F 11/1666 | 711/E12.019 |
| 2011/0040968 A1* | 2/2011 | Liu | H04L 61/5038 | 713/162 |
| 2011/0179267 A1* | 7/2011 | Xie | H04L 63/0227 | 713/153 |
| 2011/0202972 A1* | 8/2011 | Jiang | H04L 69/161 | 726/3 |
| 2011/0208923 A1* | 8/2011 | Zhang | G06F 3/0607 | 711/E12.001 |
| 2011/0211685 A1* | 9/2011 | Liu | H04L 65/1079 | 379/201.02 |
| 2011/0231931 A1* | 9/2011 | Ma | H04L 63/1441 | 726/22 |
| 2011/0246685 A1* | 10/2011 | Hu | G06F 11/3041 | 710/18 |
| 2011/0258255 A1* | 10/2011 | Luo | H04L 67/02 | 709/203 |
| 2011/0258389 A1* | 10/2011 | Li | G06F 3/0605 | 711/E12.019 |
| 2011/0264833 A1* | 10/2011 | Zhang | G06F 3/0658 | 710/74 |
| 2011/0264908 A1* | 10/2011 | Feng | H04L 9/3247 | 713/168 |
| 2011/0265181 A1* | 10/2011 | Jiang | H04L 12/66 | 726/22 |
| 2011/0320532 A1* | 12/2011 | Cheng | G06F 16/182 | 709/203 |
| 2011/0320712 A1* | 12/2011 | Xu | G06F 3/0634 | 711/E12.001 |
| 2012/0032508 A1* | 2/2012 | Du | H02P 27/08 | 307/31 |
| 2012/0036394 A1* | 2/2012 | Feng | G06F 11/1662 | 714/4.12 |
| 2012/0089799 A1* | 4/2012 | Wei | G06F 11/2094 | 711/E12.103 |
| 2012/0124660 A1* | 5/2012 | Wang | H04L 63/083 | 726/3 |
| 2012/0137042 A1* | 5/2012 | Wang | G06F 13/4022 | 710/313 |
| 2012/0144192 A1* | 6/2012 | Chen | H04L 63/10 | 726/4 |
| 2012/0151070 A1* | 6/2012 | Li | H04L 67/59 | 709/227 |
| 2012/0173941 A1* | 7/2012 | Tong | H04L 12/12 | 714/E11.155 |
| 2012/0203910 A1* | 8/2012 | Lan | H04L 67/1012 | 709/226 |
| 2012/0204264 A1* | 8/2012 | Jiang | H04L 41/12 | 726/23 |
| 2012/0233691 A1* | 9/2012 | Jiang | H04L 63/1416 | 726/22 |
| 2012/0239804 A1* | 9/2012 | Liu | H04L 47/10 | 709/224 |
| 2012/0254977 A1* | 10/2012 | Jiang | H04L 63/1458 | 726/12 |
| 2012/0259941 A1* | 10/2012 | Luo | G06F 3/0644 | 709/212 |
| 2012/0260125 A1* | 10/2012 | Wang | G06F 11/1096 | 714/6.2 |
| 2014/0379901 A1* | 12/2014 | Tseitlin | H04L 43/08 | 709/224 |
| 2015/0039560 A1* | 2/2015 | Barker | G06F 16/93 | 707/626 |
| 2016/0352588 A1* | 12/2016 | Subbarayan | H04L 45/58 | |
| 2018/0004453 A1* | 1/2018 | Baptist | G06F 3/0659 | |
| 2018/0039494 A1* | 2/2018 | Lander | H04L 45/02 | |
| 2018/0262592 A1* | 9/2018 | Zandi | H04L 67/55 | |
| 2018/0324646 A1* | 11/2018 | Lee | H04W 36/0016 | |
| 2018/0343567 A1* | 11/2018 | Ashrafi | H04L 43/20 | |
| 2019/0045351 A1* | 2/2019 | Zee | H04W 76/11 | |
| 2019/0075552 A1* | 3/2019 | Yu | H04W 24/10 | |
| 2019/0116486 A1* | 4/2019 | Kim | H04W 8/10 | |
| 2019/0158364 A1* | 5/2019 | Zhang | H04L 41/5054 | |
| 2019/0173740 A1* | 6/2019 | Zhang | H04L 41/0677 | |
| 2019/0174561 A1* | 6/2019 | Sivavakeesar | H04W 76/10 | |
| 2019/0182875 A1* | 6/2019 | Talebi Fard | H04W 76/11 | |
| 2019/0191348 A1* | 6/2019 | Futaki | H04W 36/0033 | |
| 2019/0191467 A1* | 6/2019 | Dao | H04W 76/11 | |
| 2019/0223093 A1* | 7/2019 | Watfa | H04W 36/24 | |
| 2019/0251241 A1* | 8/2019 | Bykampadi | H04W 12/009 | |
| 2019/0253894 A1* | 8/2019 | Bykampadi | H04L 67/51 | |
| 2019/0261244 A1* | 8/2019 | Jung | H04W 36/305 | |
| 2019/0306907 A1* | 10/2019 | Andreoli-Fang | H04L 12/66 | |
| 2019/0313236 A1* | 10/2019 | Lee | H04W 88/023 | |
| 2019/0313437 A1* | 10/2019 | Jung | H04L 5/0042 | |
| 2019/0313469 A1* | 10/2019 | Karampatsis | H04W 76/14 | |
| 2019/0335002 A1* | 10/2019 | Bogineni | H04W 8/22 | |
| 2019/0335534 A1* | 10/2019 | Atarius | H04L 65/1016 | |
| 2019/0394624 A1* | 12/2019 | Karampatsis | H04W 76/15 | |
| 2020/0008069 A1* | 1/2020 | Zhu | H04W 16/14 | |
| 2020/0028920 A1* | 1/2020 | Livanos | H04W 8/26 | |
| 2020/0045753 A1* | 2/2020 | Dao | H04W 4/08 | |
| 2020/0053670 A1* | 2/2020 | Jung | H04W 56/00 | |
| 2020/0059856 A1* | 2/2020 | Cui | H04W 24/02 | |
| 2020/0136911 A1* | 4/2020 | Assali | H04L 67/1008 | |
| 2020/0267214 A1 | 8/2020 | Yang | | |

(56) References Cited

U.S. PATENT DOCUMENTS

| | | | |
|---|---|---|---|
| 2020/0322775 A1 | 10/2020 | Lee et al. | |
| 2021/0136047 A1* | 5/2021 | Wilson | H04L 9/0825 |
| 2021/0234706 A1* | 7/2021 | Nair | H04L 9/0825 |
| 2021/0240554 A1* | 8/2021 | Landais | G06F 9/541 |
| 2021/0288802 A1* | 9/2021 | Muhanna | H04L 9/3263 |
| 2021/0297935 A1* | 9/2021 | Belling | H04L 45/00 |
| 2022/0158926 A1* | 5/2022 | Wennerström | H04L 41/0853 |
| 2022/0182835 A1 | 6/2022 | Rajput | |
| 2022/0353263 A1* | 11/2022 | Choyi | H04L 12/12 |
| 2022/0386225 A1* | 12/2022 | Sapra | H04L 43/0876 |
| 2023/0030315 A1* | 2/2023 | Khare | H04L 63/0807 |
| 2023/0308853 A1* | 9/2023 | Ding | H04W 4/40 |
| 2023/0362970 A1* | 11/2023 | Furuichi | H04W 72/1215 |
| 2023/0396602 A1* | 12/2023 | Wu | H04L 63/0884 |
| 2023/0412589 A1* | 12/2023 | Jost | H04L 63/083 |

FOREIGN PATENT DOCUMENTS

| | | |
|---|---|---|
| EP | 3886390 A1 | 9/2021 |
| EP | 4260515 | 10/2023 |
| WO | WO 2022/125212 A1 | 6/2022 |

OTHER PUBLICATIONS

Final Office Action for U.S. Appl. No. 17/115,746 (Jul. 18, 2023).

Applicant-Initiated Interview Summary for U.S. Appl. No. 17/115,746 (Apr. 26, 2023).

Non-Final Office Action for U.S. Appl. No. 17/115,746 (Dec. 23, 2022).

Notification of Transmittal of the International Search Report and the Written Opinion of the International Searching Authority, or the Declaration for International Application No. PCT/US2021/057158 (Jan. 27, 2022).

"3rd Generation Partnership Project; Technical Specification Group Core Network and Terminals; 5G System; Network Function Repository Services: Stage 3 (Release 16)," 3GPP TS 29.510, V16.5.0, pp. 1-208 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

Jones et al., "JSON Web Token (JWT)," RFC 7519, pp. 1-30 (May 2015).

Jones et al., "JSON Web Signature (JWS)," RFC 7515, pp. 1-59 (May 2015).

Jones et al., "The OAuth 2.0 Authorization Framework: Bearer Token Usage," RFC 6750, pp. 1-18 (Oct. 2012).

Hardt, "The OAuth 2.0 Authorization Framework," RFC 6749, pp. 1-76 (Oct. 2012).

Dierks et al., "The Transport Layer Security (TLS) Protocol Version 1.2," RFC 5246, pp. 1-104 (Aug. 2008).

Housley et al., "Internet X.509 Public Key Infrastructure Certificate and Certificate Revocation List (CRL) Profile," RFC 3280, pp. 1-129 (Apr. 2002).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

Jones et al. "JSON Web Signature (JWS)," Internet Engineering Task Force (IETF), Request for Comments 7515, pp. 1-59 (May 2015).

Akon et al., "Formal Analysis of Access Control Mechanism of 5G Core Network," CCS '23: Proceedings of the 2023 ACS SIGSAC Conference on Computer and Communications Security; Nov. 2023, pp. 666-680 (2023).

Notice of Allowance for U.S. Appl. No. 17/115,746 (Dec. 20, 2023).

* cited by examiner

METHODS, SYSTEMS, AND COMPUTER READABLE MEDIA FOR SHARING KEY IDENTIFICATION AND PUBLIC CERTIFICATE DATA FOR ACCESS TOKEN VERIFICATION

TECHNICAL FIELD

The subject matter described herein relates to dynamically sharing certificate data used for verifying access tokens. More particularly, the subject matter described herein relates to methods, systems, and computer readable media for sharing key identification (key ID) and public certificate data for access token verification.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as contact and capacity information regarding the producer NF instance.

One example of an intermediate proxy that forwards traffic between producer NFs and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that 3GPP standards do not define how certificates and public keys should be shared between network functions and the NRF. The exchange and sharing of certificates and associated public keys are necessary for the validation of access tokens that correspond to producer NFs and are managed by the NRF. However, the aforementioned lack of guidelines permit network vendors to implement custom solutions, such as the static provisioning of certificates at the numerous NFs or utilizing a public key infrastructure (PKI) and/or vault model that is shared by the NFs and NRF. Each of these likely customized solutions has its unique drawbacks (e.g., tedious and error prone provisioning and/or various vendor entities with different requirements/protocols) that present considerable challenges to efficiently distribute certificate and public key information among producer NFs.

Accordingly, in light of these and other difficulties, there exists a need for improved methods, systems, and computer readable media for sharing key identification and public certificate data for access token verification.

SUMMARY

A method for sharing key identification (key ID) and public certificate data for access token verification comprises, at an NF repository function (NRF) including at least one processor, receiving, from a producer NF, an NF registration message including key ID version information. The method also includes, in response to detecting the key ID version information, sending, to the producer NF, an NF registration response message including a current key ID version value, at least one digital certificate, and at least one corresponding public key to the producer NF. The method further includes receiving, from the producer NF, an NF update message that includes the current key ID version value and in response to determining that the current key ID version value in the NF update message does not match an updated key ID version value maintained at the NRF, sending an NF update response message that the updated key ID version value, at least one updated digital certificate, and at least one corresponding updated public key to the producer NF.

According to another aspect of the method described herein, the current key ID version information is communicated via a first custom header section of the NF update message that includes a vendor-dynamic-keyID-version parameter.

According to another aspect of the method described herein, the at least one updated digital certificate and the at least one corresponding updated public key is communicated via a second custom header section of the NF update response message that includes a vendor-dynamic-keyID-pair parameter.

According to another aspect of the method described herein, the NF update message is an NF heart-beat request message and the NF update response message is a heart-beat response message.

According to another aspect of the method described herein, in response to determining that the current key ID version value in the NF update message matches the updated key ID version value maintained at the NRF, sending an NF update response message that includes the current key ID version value.

According to another aspect of the method described herein, the NRF is configured to update the current key ID version value in response to adding or deleting a public key.

According to another aspect of the method described herein, using, by the producer NF, the at least one corresponding updated public key to verify a digital signature of an access token received from a consumer NF, wherein the access token includes at least one key ID originating from the NRF.

According to another aspect of the subject matter described herein, a system for sharing key ID and public certificate data for access token verification comprises an NRF including at least one processor and a memory, and a key identifier distribution manager (KDM) implemented by the at least one processor configured for receiving, from a producer NF, an NF registration message including key ID version information; in response to detecting the key ID version information, sending, to the producer NF, an NF registration response message including a current key ID version value, at least one digital certificate, and at least one corresponding public key to the producer NF; receiving, from the producer NF, an NF update message that includes the current key ID version value; and in response to determining that the current key ID version value in the NF update message does not match an updated key ID version value maintained at the NRF, sending an NF update response message that the updated key ID version value, at least one updated digital certificate, and at least one corresponding updated public key to the producer NF.

The subject matter described herein can be implemented in software in combination with hardware and/or firmware. For example, the subject matter described herein can be implemented in software executed by a processor. In one exemplary implementation, the subject matter described herein can be implemented using one or more non-transitory computer readable media having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
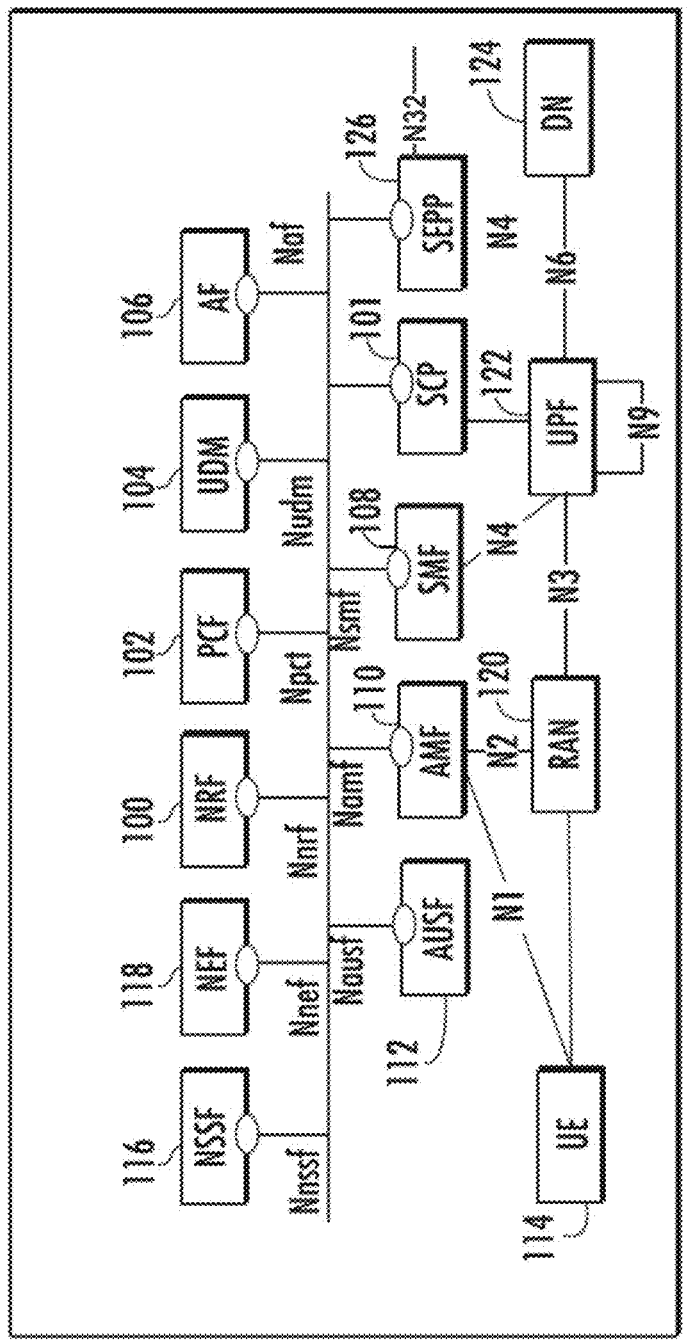
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

As indicated above, there are many instances where the NRF needs to provide certificate and public key information to each of a plurality of supported producer NFs in order to facilitate the management and verification of access tokens. For example, the NRF may be configured to verify that input parameters (e.g., NF type) contained in an access token request from the consumer NF match the corresponding parameters included in the public key certificate of the consumer NF (e.g., NF service consumer) or in the NF profile of the consumer NF. If a match is found, the NRF can be configured to determine that the consumer NF is authorized to access the requested service(s). If the consumer NF is authorized, the NRF may then generate an access token containing the appropriate JSON web claims.

Further, the NRF shall digitally sign the requested access token using a shared secret or private key corresponding to the producer NF (i.e., a producer NF that has been provisioned with the NRF's public key). If the Consumer NF is not authorized, the NRF shall not issue an access token to the Consumer NF. The producer NF (e.g., NF service producer) ensures the integrity of the access token by verifying the NRF's digital signature using the NRF's public key (or checking the media access control (MAC) value using the shared secret). If the integrity check is successful, the NF Service producer shall verify the claims in the token.

Figure 2:
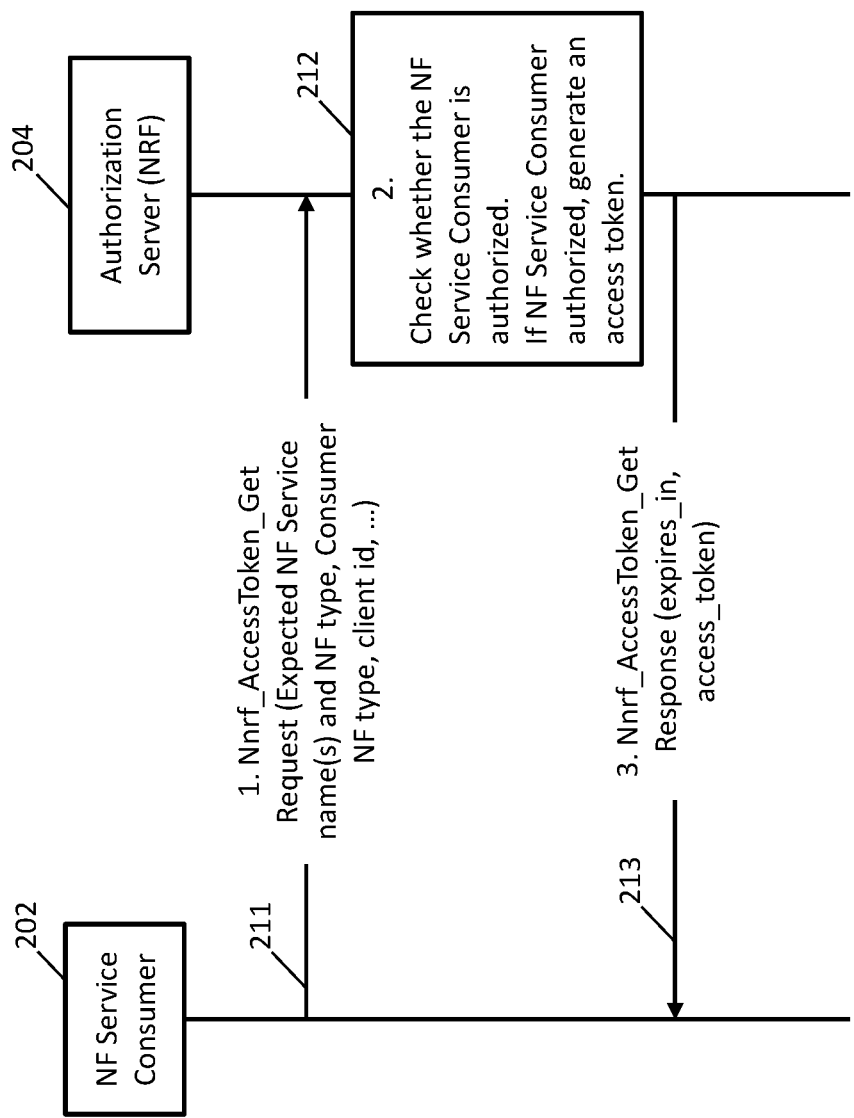
FIG. 2 is a message flow diagram illustrating exemplary messages exchanged for an NF access token request.

To illustrate, FIG. 2 is a message flow diagram illustrating exemplary messages exchanged for an NF access token request. As shown in FIG. 2, NF service consumer 202 sends an access token request message 211 (e.g., Nnrf_AccessToken_GetRequest message) to an NRF 204 or other authorization server. In particular, request message 211 may include input parameter information associated with the consumer server NF and target producer server NF, such as an expected NF service name, NF type, consumer NF type, client identifier, and the like. In response to receiving request message 211, NRF 204 is configured to verify the input parameter information included in the access token request message 211. In particular, block 212 in FIG. 2 indicates that NRF 204 determines whether the sending NF service consumer 202 is authorized to access the requested service(s). NRF 204 may conduct the authorization check by verifying that the input parameters (e.g., NF type) in the access token request match the corresponding parameters included in either i) the public key certificate of the NF service consumer or ii) the NF profile of the NF service consumer, both of which are locally stored at NRF 204.

If the NF service consumer 202 is not authorized, NRF 204 does not generate and/or issue an access token to the NF service consumer. If NF service consumer 202 is determined to have authorization, NRF 204 is configured to generate an access token that includes a plurality of appropriate JSON web token (JWT) claims. Technical specification 33.501 specifies that access tokens are secured with digital signatures or Message Authentication Codes (MAC) based on JSON Web Signature (JWS) as described in RFC 7515. Thus, NRF 204 can also digitally sign the generated access token based on a shared secret or a private key stored locally at the NRF. After verifying the authorization of NF service consumer 202 and generating the access token, NRF 204 sends the access token via response message 213 (e.g., an Nnrf_AccessToken_Get Response message).

Figure 3:
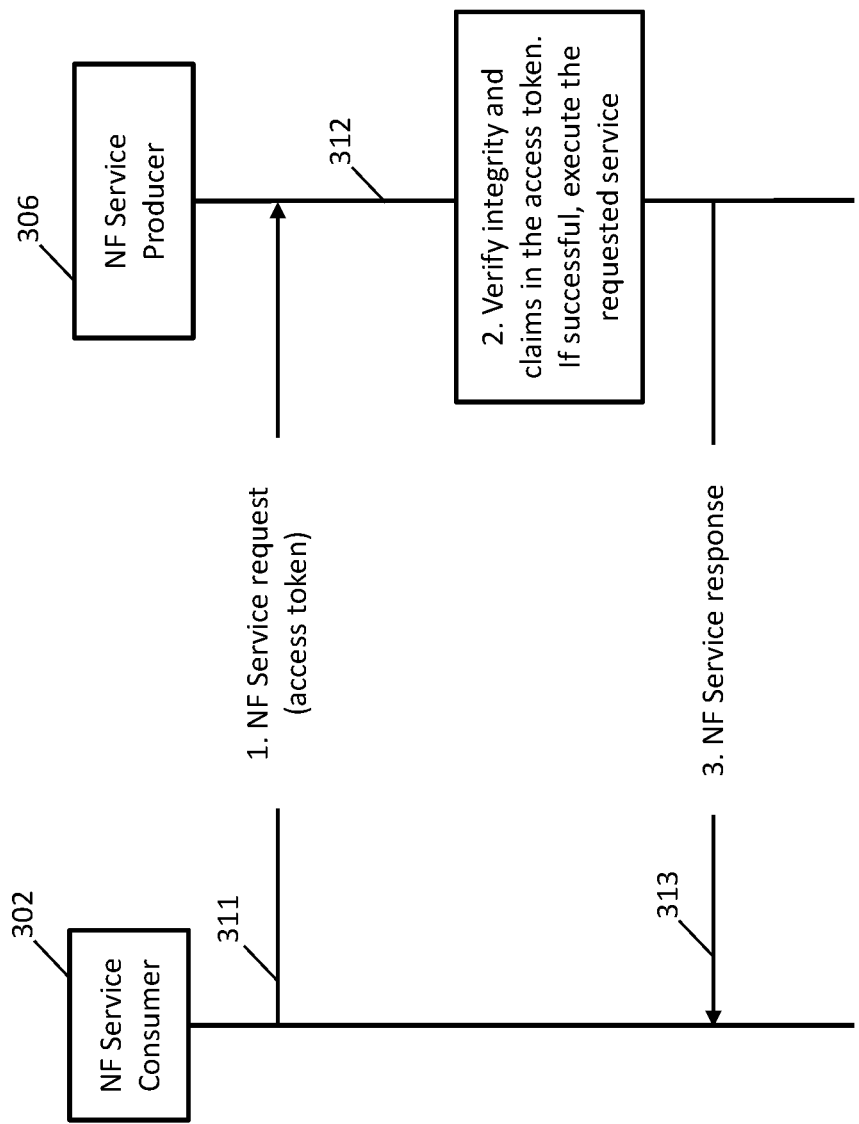
FIG. 3 is a message flow diagram illustrating exemplary messages exchanged for an NF service request.

Likewise, FIG. 3 illustrates message signaling that occurs after the NF service consumer receives access token from the NRF. For example, upon receiving the access token (e.g., in a manner illustrated in FIG. 2), an NF service consumer 302 may be configured to send an NF service request message 311 containing the access token to an NF service producer 306. Upon receiving the access token from the NF service consumer 302, the NF service producer 306 verifies the integrity and claims in the received access token (see block 312). For example, NF service producer 306 ensures the integrity of the access token by verifying the NRF's digital signature using the NRF's public key (e.g., which was previously provided to the NF service producer by the NRF) or by checking the MAC address/value indicated in the access token using a shared secret. If the integrity check is successful, the NF service producer is configured to verify the web token claims in the access token.

After the integrity and claims of the access token have been successfully verified, NF service producer 306 generates an NF service response message 313 that is directed to NF service consumer 302 and provides the requested service.

Notably, FIGS. 2 and 3 illustrate access token call flows occurring in a single PLMN (i.e., non-roaming case). In other scenarios, the access token flow (e.g., consumer NF access token requests and access token verification by producer NF) can take place in multiple PLMNs in a roaming case. In such a scenario, the NF service consumer that is supporting a roaming mobile device can register with a home NRF (e.g., in a home PLMN) via a visitor NRF (e.g., in a visitor PLMN), which is configured to forward access token request messages to the home NRF after authenticating the client NF service consumer. Further, an NF service consumer can also be configured to send an NF service request message containing an access token to an NF service producer located in a different PLMN in a roaming scenario. In such a case, the service request message is communicated over other intermediary network elements, such as a consumer SEPP (cSEPP) and a producer SEPP (pSEPP).

As networks expand, there is a need for an NRF to share its public key and certificate with several producer NFs for the purpose of access token validation. For the management of multiple public/private certificate pairs, the use of a key identifier (key ID or kid) is one possible solution. For example, when the NRF has to rotate or renew its certificate (e.g., for expired or compromised certificates), this certificate renewal process has an impact on previously issued access tokens since these issued access tokens have been digitally signed with expired/rotated private certificates of the NRF.

There are scenarios where NRF may be configured to include a key ID in an access token sent to a consumer NF, which can serve as a hint for a producer NF to verify the identity of the NRF and determine which certificate pair was used. More specifically, the NRF can utilize the key ID to establish and indicate the private key that was used for digitally signing the access token (e.g., the NRF may be configured to add at least one key ID in an access token). Similarly, the producer NF can utilize the key ID in the NF service request message to identify the corresponding public certificate, which can be used to verify the digital signature.

One problem that is experienced among network functions is the actual implementation of sharing multiple public keys with a producer NF. In some instances, the NRF may generate "N" number of private/public certificate pairs and map these pairs to different key IDs. However, there are challenges involved with providing multiple versions of public key/certificate and key ID information to one or more producer NFs. In particular, since the producer NF does not know or learn about new key IDs associated with public certificates that have been rotated/renewed, present key ID distribution solutions do not work.

As such, there is a need for a process that allows the NRF to publish and/or provide key ID and public certificate information to the producer NFs in a dynamic manner. The sharing of key ID and public certificate information is compelled when the NRF rotates or renews its public certificate pair data (e.g., deleting old key IDs and public certificate pairs and/or adding new key IDs and public certificate pairs).

As indicated above, 3GPP standards do not provide clear guidelines on how key IDs and public certificates should be provided from the NRF to producer NFs. As such, different vendors typically employ unique custom implementations. While some possible industry practices can involve statically configuring the key ID and public certificate at each of the producer NFs, such static management of the producer NF can prove to be error prone and tedious, especially in scenarios where an NRF is responsible for managing hundreds of producer NFs. Similarly, utilizing a shared PKI/vault model among an NRF and producer NFs is also challenging when the producer NFs are associated with different vendors.

Figure 4:
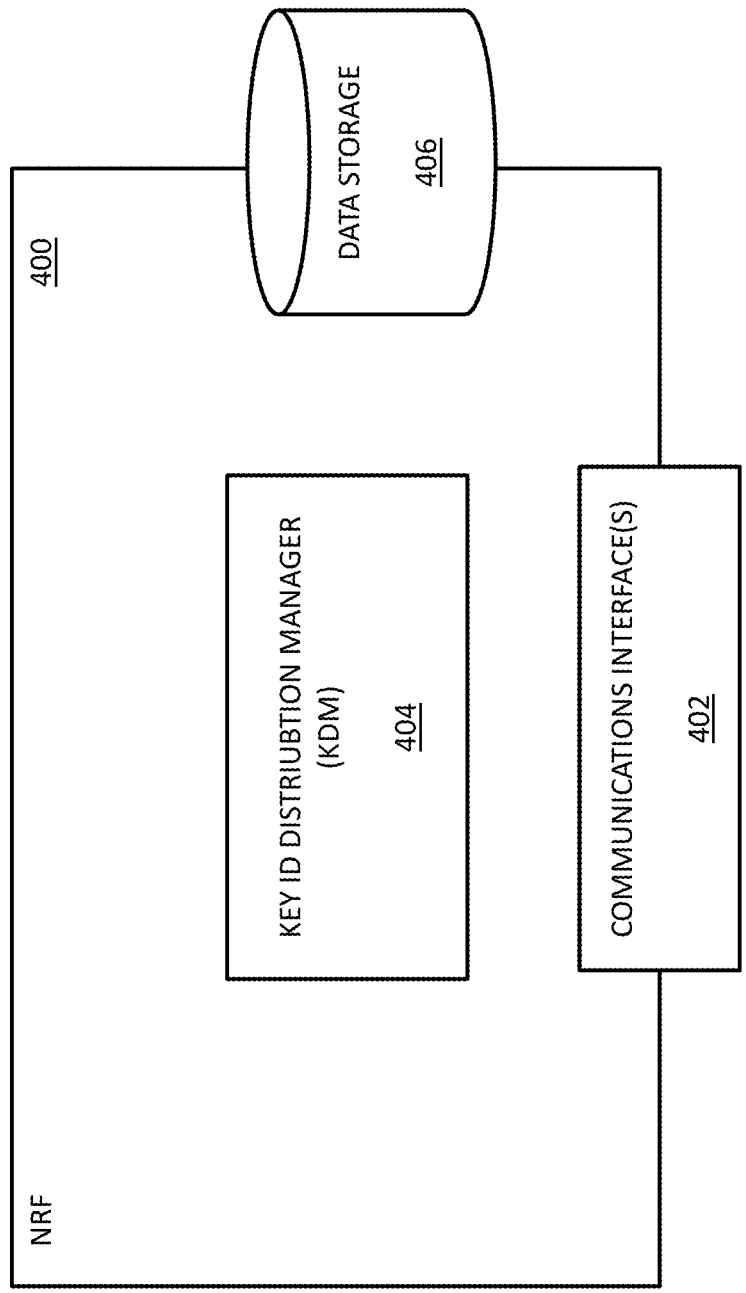
FIG. 4 is a block diagram illustrating an exemplary architecture for an NRF sharing key identification and public certificate data for access token verification.

FIG. 4 is a diagram illustrating an example network node, e.g., NRF 400, for sharing key identification and public certificate data for access token verification in a communications network. NRF 400 may represent any suitable entity or entities (e.g., one or more node(s), device(s), or computing platform(s)) for performing various aspects associated with generating, sharing, and managing key identification data and public/private certificate data for access token verification. In some embodiments, NRF 400 may represent or include an authorization server, a network gateway, a network proxy, an edge security device, an exposure function, or other functionality.

Referring to FIG. 4, NRF 400 may include one or more communications interface(s) 402 for communicating messages via a communications environment, e.g., one or more 5G networks. For example, communications interface(s) 402 may include one or more communication interfaces for communicating with various entities in a home network (e.g., home public land mobile network (H-PLMN)) or a visited network (e.g., a visited public land mobile network (V-PLMN)).

NRF 400 may include a key ID distribution manager (KDM) 404. KDM 404 may be any suitable entity (e.g., software stored in memory and executing on at least one processor) for performing one or more aspects associated with sharing key identification and public certificate data for access token verification in a communications network. In some embodiments, KDM 404 may be configured for receiving, from a producer NF, an NF registration message including a first custom header section containing key identifier (ID) version information; in response to detecting the first custom header section, sending an NF registration response message including a first custom header with current key ID version information and a second custom header section containing at least one digital certificate and at least one corresponding public key to the producer NF; receiving, from the producer NF, an NF update message that includes the first custom header section containing a current key ID version value; and in response to determining that the current key ID version value in the NF update message does not match the updated key ID version value maintained at the NRF, sending an NF update response message that includes a first custom header section containing an updated key ID version value and a second custom header section that includes at least one updated digital certificate and at least one corresponding updated public key to the producer NF.

NRF 400 may also comprise data storage 406, which can include any storage medium that is configured to store and maintain database tables that contain entries mapping key IDs, private/public key pairs, Producer NFs, version value data, and the like. NRF 400 and/or KDM 404 can be configured to add or delete entire entries or individual parameters during the course of operation.

Figure 5:
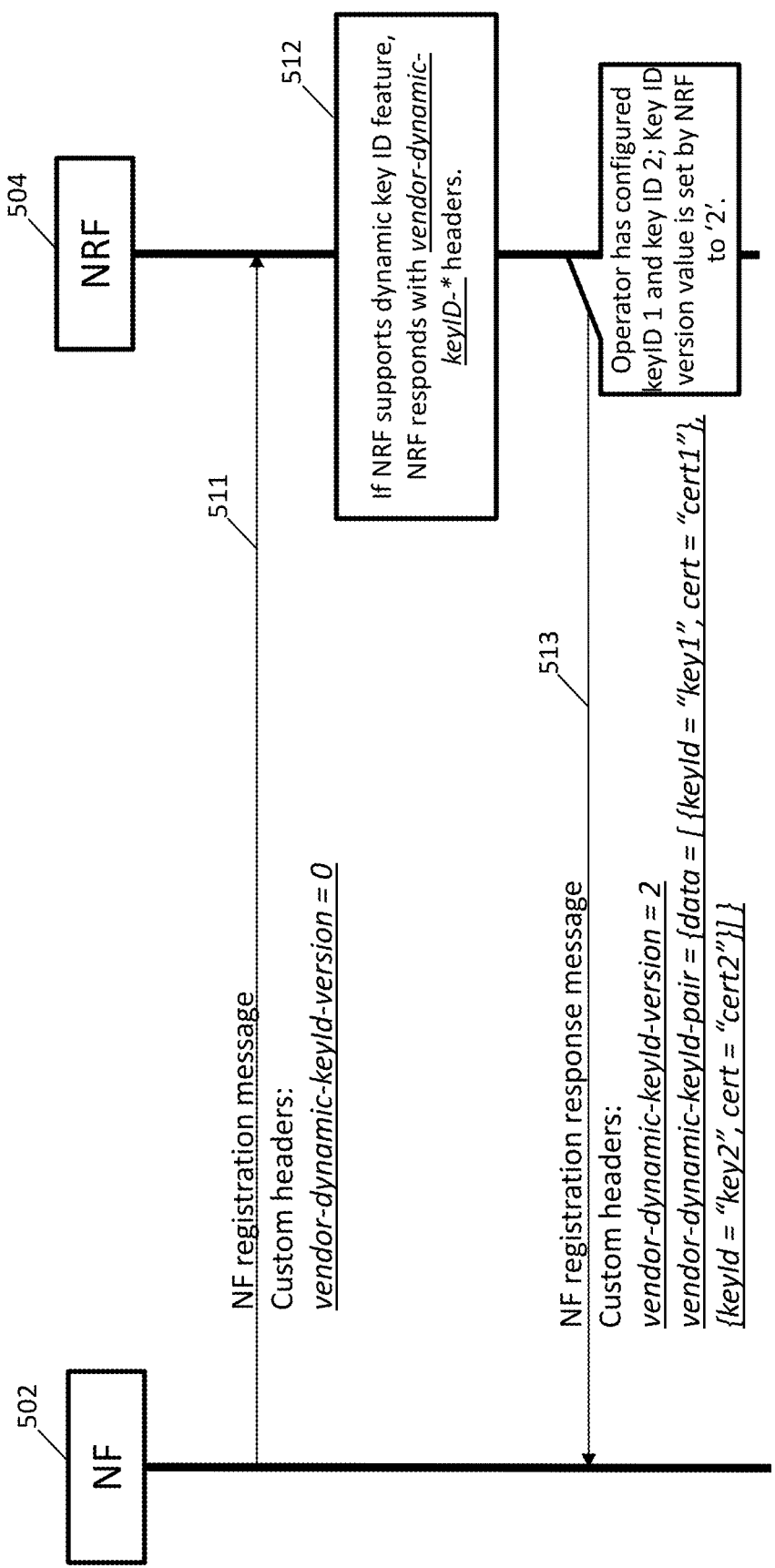
FIG. 5 is a message flow diagram illustrating exemplary messages exchanged during a producer NF registration process.
Figure 6:
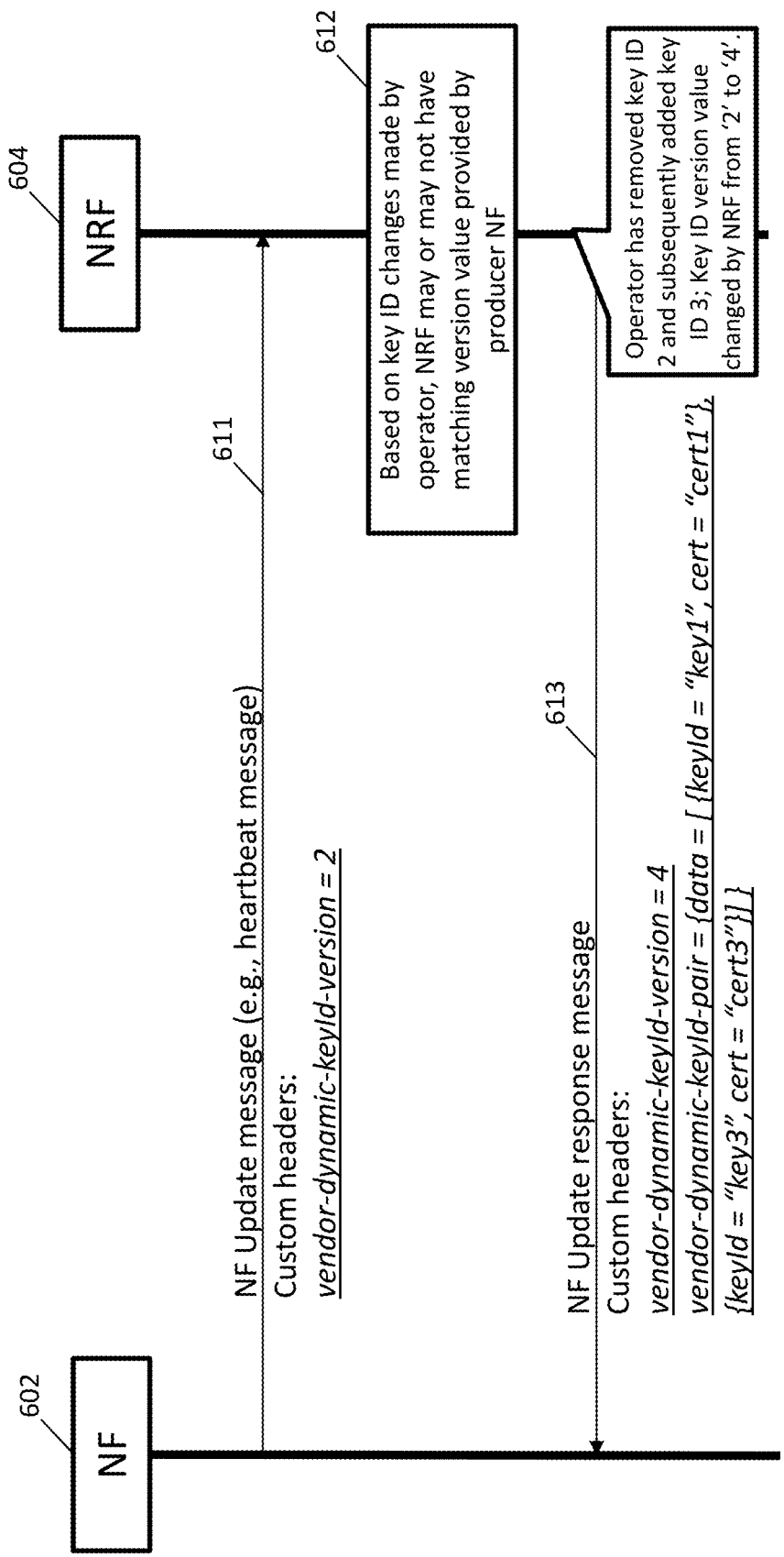
FIG. 6 is a message flow diagram illustrating exemplary messages exchanged when an NF publishes a version information using NF heart-beat messages.

To further illustrate the operation of NRF 400 and/or KDM 404, exemplary signaling message flows are depicted in FIGS. 5 and 6. For example, FIG. 5 is a message flow diagram illustrating exemplary messages exchanged during a producer NF registration process.

In some embodiments, the producer NF is configured to communicate key ID value version information to the NRF during the NF registration (or re-registration) stage. For example, a producer NF can send a registration message that includes data (e.g., a custom header with key ID version value data) indicating that the producer NF is capable of processing or handling key IDs and public certificates from the NRF. Notably, the key ID version parameter indicates the version value/number for the grouping of the one or more key IDs maintained by the producer NF. At the registration stage, the initial/default key ID version value is "0" (since the producer NF does not maintain any NRF public keys yet).

Similarly, the NRF also maintains a key ID version parameter that represents the current version number/value for the grouping of the one or more key IDs stored and/or maintained at the NRF. Notably, each key ID version value is associated with one or more digital certificates and corresponding one or more public key(s). Each time a new key pair is added or an old key pair is deleted from the stored key ID group, the NRF is configured to increment the current version value by "1". Further, the NRF can provide the updated key ID version value information in a customized header section of an NF heart-beat response message (or NF Update response message) directed to the producer NF (see below). During the NF registration stage, the NRF provides the Producer NF with the current version value information in a first custom header section of a registration response message and the corresponding key ID(s) and digital certificate(s) in a second custom header section of the registration response message.

After the registration stage is concluded, the producer NF is configured to transmit NF heart-beat messages (e.g., NF update messages) to the NRF. Notably, these NF heart-beat messages can be used by the producer NF to share the last known version value of the key ID that was provided by the NRF. Upon receiving this NF heart-beat request message, the NRF will determine if that key ID version value matches the version value of key ID that is currently stored and/or maintained by the NRF. If the NRF determines that that the key ID has been updated to a different version (e.g., addition or deletion of one or more public keys), the NRF will share an updated list of public keys and associated key ID version value information with the producer NF in an NF heart-beat response message.

Notably, the producer NF and the NRF are configured to communicate and share the key ID version value information and corresponding public keys and digital certificates via custom headers in NF heart-beat response messages. In some embodiments, the producer NF can be configured to utilize a custom header in the NF heart-beat messages directed to the NRF. For example, the registration message or the NF heart-beat message can include first custom header section that contains a "vendor-dynamic-keyid-version" parameter (e.g., an attribute-value pair parameter) that serves to indicate a version value/number of one or more key IDs. In the custom header of the initial registration message, the vendor-dynamic-keyid-version" parameter can be established with an initial default value of "0", which indicates that no key ID is stored on the sending producer NF and/or is known by the sender of the message (e.g., vendor-dynamic-keyid-version=0).

If the NRF sends a registration response message or an heart-beat response message with a custom header containing a vendor-dynamic-keyid-version" parameter equal to "0", then no key ID exists at the NRF. Further, the producer NF is responsible for sending a vendor-dynamic-keyid-version parameter and value in the custom header of an NF heart-beat message, which indicates the last key ID version value reported to the producer NF by the NRF.

In response to an NF heart-beat request message from a producer NF, the NRF is configured to provide an updated and/or current vendor-dynamic-keyid-version information to registered producer NFs. If the NRF has any change or modification to the key ID configuration (i.e., a version shared by the producer NF is not the same as current version at the NRF), the NRF is configured to send an NF heart-beat response message with a custom header that contains an updated vendor-dynamic-keyid-pair parameter.

If an NF sends an NF heart-beat request message (or even a re-registration message) with a custom header containing the "vendor-dynamic-keyid-version" parameter, the parameter indicates the current version of the key IDs (and identified public keys) that are known to the producer NF at that time. When the NRF sends a response message, the "vendor-dynamic-keyid-version" parameter indicates the key ID version value of the key ID(s) presently stored by the NRF.

Another parameter that can be contained in a custom header includes the "vendor-dynamic-keyid-pair" parameter. Notably, this parameter is included in the custom header sent by the NRF in response to a registration request and/or an NF heart-beat message. In some embodiments, the vendor-dynamic-keyid-pair contains a list of known key IDs and corresponding public keys and certificates associated with the NRF. The NRF can be configured to send a message with this custom header as a response message if i) vendor-dynamic-keyid-version is less than "1" at the NRF or ii) the value of the vendor-dynamic-keyid-version value from the NF is not the same as the key ID version value stored at the NRF.

In some embodiments, the vendor-dynamic-keyid-pair parameter is a JSON data structure providing one or more key IDs and public certificate pairs (e.g., vendor-dynamic-keyid-pair=<JSON data structure indicating one or more key ID and public certificate pairs>). For example, the JSON format can include {data=[keyID: <key ID>, cert: <X.509 Certificate>]}. In some embodiments, the certificate format is defined by "x5c" as specified in RFC 7515.

The use of the custom headers is best described using the examples depicted in FIGS. 5 and 6. For example in FIG. 5, producer NF 502 sends an NF registration message 511 to NRF 504. Notably, producer NF 502 can be configured to add a vendor-dynamic-keyid-version parameter as a custom header section with a value set to "0". This parameter serves as an indication to NRF 504 that producer NF 502 has the capability to handle key ID and public certificates in a dynamic manner (i.e., dynamic key ID support functionality). The parameter also serves as an indication to NRF 504 that producer NF 502 is starting with version "0" (i.e., this means that producer NF 502 has no key ID pair information). Further, this custom header section is helpful if producer NF 502 is re-registering after an NF heart-beat loss or failure scenario. In some embodiments, producer NF 502 can disable the described dynamic key ID support functionality by ceasing to include the vendor-dynamic-keyid-version parameter in the custom headers of NF heart-beat request messages sent to NRF 504.

After receiving NF registration message 511 (e.g., as defined by Section 5.2.2.2 of 3GPP TS 29.510), NRF 504 is configured to generate a registration response message with a custom header that includes the current vendor-dynamic-keyid-version value information (see block 512 in FIG. 5). For example, suppose NRF 504 is presently configured by a network operator to store 'key ID 1' and 'key ID 2'. In such a scenario, the key ID version is set to '2' (i.e., indicative of two changes since version '0'). The generated registration response message will also include a second custom header section that includes the key ID pair information (i.e., key identifiers and certificates). For example, registration response message 513 as shown in FIG. 5 includes custom header sections i) a vendor-dynamic-keyid-version parameter set to a value of "2" and ii) a vendor-dynamic-keyid-pair parameter that specifies the actual key ID and certificate pair data (e.g., {keyID="key1", cert="cert1"}, {keyID="key2", cert="cert2"}). Notably, receiving producer NF 502 will record and/or update its local key ID and certificate information records with the certificate information and key ID version data contained in response message 513.

In FIG. 6, producer NF 602 is configured to periodically send NF heart-beat request messages to NRF 604. For example, producer NF 602 sends an NF update message 611 (as defined by Section 5.2.2.3 of 3GPP TS 29.510) to NRF 604. In some embodiments, message 611 comprises an NF heart-beat request message including a custom header section that contains a vendor-dynamic-keyid-version parameter, which is set to a value of "2". In response to receiving message 611, NRF 604 parses the message to determine the key ID version value and subsequently determines if the key ID version value matches the current key ID version value stored locally by NRF 604 (e.g., see block 612). If the two compared key ID version values do not match, then NRF 604 may be configured to generate an NF heart-beat response message that includes a custom header section containing the updated key ID version information (as described below).

For example, consider the case where a network operator has removed 'key ID 2' and added 'key ID 3' from a local key ID store in NRF 604. In this scenario, the version value will change from '2' to '4' (i.e., the removal of "key ID 2" changes version value to '3' and the addition of "key ID 3" changes the version value to '4' in the local key ID store). NRF 604 subsequently generates an NF heart-beat response message 613 (e.g., "200 OK" message) that includes custom header sections that respectively indicate i) the updated key ID version value and ii) the updated key ID and certificate pairs. For example, message 613 in FIG. 6 can include custom headers containing i) vendor-dynamic-keyid-version=4 and ii) vendor-dynamic-keyidpair={data={keyID="key1", cert="cert1"}, {keyID="key3", cert="cert3"}}).

After generating NF heart-beat response message 613, NRF 604 can direct message 613 to producer NF 602. Notably, producer NF 602 can utilize the provided public key(s) and certificate information to verify the integrity (e.g., verify the NRF digital signature) and claims in access tokens received from consumer NFs requesting service. In some embodiments, the access tokens received from a consumer NF includes at least one key ID that originated from the NRF.

Figure 7:
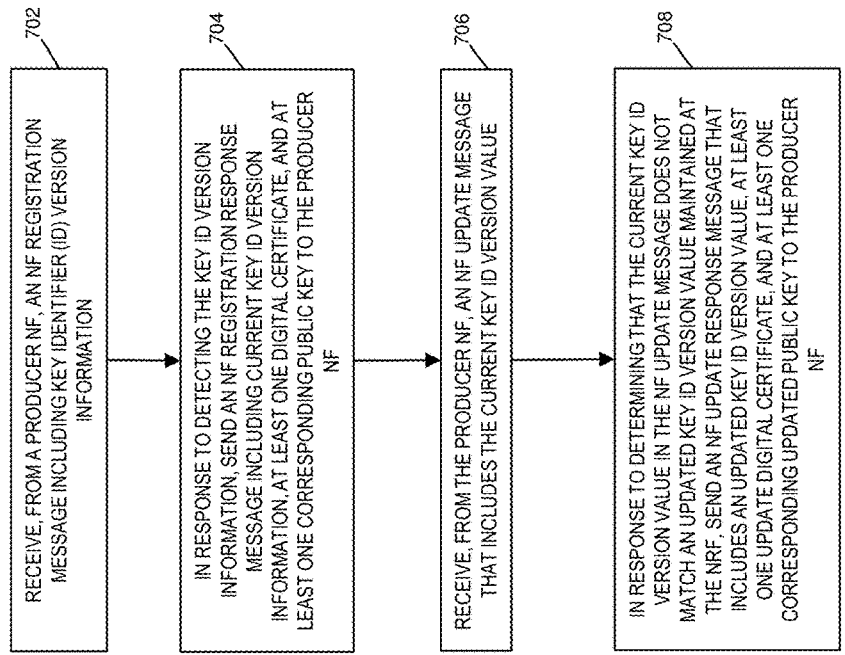
FIG. 7 is a flow chart illustrating an exemplary process for sharing key identification and public certificate data for access token verification.

FIG. 7 is a flow chart illustrating an example process for sharing key ID and public certificate data for access token verification according to an embodiment of the subject matter described herein. In some embodiments, method 700 depicted in FIG. 7 is an algorithm, program, or script (e.g., a verification management module as shown in FIG. 4) stored in memory that when executed by a processor performs the steps recited in blocks 702-708. In some embodiments, the method 700 represents a list of steps (or changes in steps) embodied in a state machine (e.g., either via software code programming or via a set of rules) and/or logic of the NRF and/or key ID distribution manager (KDM).

In block 702, an NF registration message including a first custom header section containing key identifier (ID) version information is received.

In some embodiments, a registration message that includes a custom header section "vendor-dynamic-keyID-version" is received by the NRF from a producer NF. Notably, the custom header section includes an initial key ID version value of "0" (e.g., vendor-dynamic-keyID-version=0), which serves as an indication to the NRF that the sending producer NF supports the dynamic key ID support functionality feature.

In block 704, in response to detecting the first custom header section, an NF registration response message including a first custom header with current key ID version information and a second custom header section containing at least one digital certificate and at least one corresponding public key is to the producer NF. In some embodiments, the NRF identifies the custom header in the NF registration message (and that the key ID version value in the custom header is equal to 0) and generates a registration response message that includes both a first custom header section and a second custom header section. Notably, the first custom header section in the registration response message includes the key ID version value of the most current version of key ID information stored at the NRF. Similarly, the second custom header section in the registration response message includes the actual certificate information and corresponding public key(s) associated with the most current key ID version value (e.g., version value=2). Notably, the receiving producer NF will update its records to include the key ID version value (e.g., change key ID version value from 0 to 2) and store the public key identifiers and certificates.

In block 706, an NF update message that includes the first custom header section containing a current key ID version value is received from the producer NF. In some embodiments, the NRF receives an NF heart-beat request message from the producer NF. In particular, the NF heart-beat request message includes a first custom header section that indicates the key ID version value that is maintained by the producer NF (e.g., vendor-dynamic-keyID-version=2). Notably, these NF heart-beat request messages are sent by the producer NF on a predefined periodic basis.

In block 708, in response to determining that the current key ID version value in the NF update message does not match the updated key ID version value maintained at the NRF, an NF update response message that includes a first custom header section containing an updated key ID version value and a second custom header section that includes at least one updated digital certificate and at least one corresponding updated public key is sent to the producer NF. In some embodiments, the NRF determines if the key ID version value in the received NF heart-beat request message matches the key ID version value presently stored at the NRF. If the key ID version values do not match (and thus indicate key ID changes recently made by the NRF and/or operator), the NRF is configured to generate an NF heart-beat response message that includes a first custom header section that contains the updated key ID version value (e.g., vendor-dynamic-keyID-version=4) and second custom header that contains the public key ID(s) and certificate(s) associated with the updated key ID version. After generating the NF heart-beat response message, the NRF sends the NF heart-beat response message to the producer NF.

Exemplary advantages of the subject matter described herein include automation of the management and exchange of key IDs and associated digital certificates that can be used by producer NFs to validate access tokens received from consumer NFs requesting service. Moreover, because the disclosed subject matter is based on a producer NF's capability to handle dynamic updates of key IDs and public certificates through heart-beat messages received from an NRF, the solution is fully backward compatible for producer NFs that do not support this feature. The disclosed subject matter also provides an efficient automatic synchronization process between an NF and the NRF, even when the NF has encountered heart-beat failures or was previously shut down by a network operator. Further, the disclosed subject matter strengthens the security of the 5G core such that a compromised private key existing at the NRF can be readily replaced by the disclose subject matter. Specifically, a network operator is able to deploy new key pairs with minimal time to replace the existing keys through automated logic at the NRF, thereby enabling/adding new keys and deleting the appreciated keys. The disclosed subject matter also affords a measure of security since only the key ID and public certificates will be exchanged between the NRF and the NF, thus securely maintaining the private certificate at the NRF for the exclusive right to digitally sign access tokens. Accordingly, other NFs will be prevented from faking or generating an access token locally that can be digitally signed with its own private key.

The disclosure of each of the following references is incorporated herein by reference in its entirety.

REFERENCES

1. Internet Engineering Task Force (IETF) Request for Comments: 7515; Javascript Object Notation (JSON) Web Signature (JWS) (May 2021)
2. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
3. 3$^{rd}$ Generation Partnership Project; Technical Specification Group Services and System Aspects; Security architecture and procedures for 5G System (5GS) (Release 17) 3GPP TS 33.501 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for sharing key identification (key ID) and public certificate data for access token verification, the method comprising:

at a network function (NF) repository function (NRF) including at least one processor:

receiving, from a producer NF, an NF registration message including key ID version information;

in response to detecting the key ID version information, sending, to the producer NF, an NF registration response message including a current key ID version value, at least one digital certificate, and at least one corresponding public key to the producer NF, wherein the current key ID version value is associated with one or more digital certificates and one or more public keys of the NRF corresponding to one or more private keys of the NRF used by the NRF to digitally sign access tokens;

adding, by the NRF, a new private key to the one or more private keys of the NRF and a new public key to the one or more public keys of the NRF, and, in response, generating an updated key ID version value;

receiving, from the producer NF, an NF update message that includes the current key ID version value; and in response to determining that the current key ID version value in the NF update message does not match the updated key ID version value maintained at the NRF, sending to the producer NF an NF update response message that includes the updated key ID version value, at least one updated digital certificate, and the new public key, wherein the new public key corresponds to the new private key, and the NRF uses the new private key to digitally sign access tokens and wherein the new public key is usable by the producer NF to verify whether a digital signature of an access token received from a consumer NF requesting service was created by the NRF using the new private key.

2. The method of claim 1 wherein the current key ID version value is communicated via a custom header section of the NF update message that includes a vendor-dynamic-keyID-version parameter.

3. The method of claim 1 wherein the at least one updated digital certificate and the new public key are communicated via a custom header section of the NF update response message that includes a vendor-dynamic-keyID-pair parameter.

4. The method of claim 1 wherein the NF update message is an NF heart-beat request message and the NF update response message is a heart-beat response message.

5. The method of claim 1 comprising, in response to determining that the current key ID version value in the NF update message matches the updated key ID version value maintained at the NRF, sending an NF update response message that includes the current key ID version value.

6. The method of claim 1 wherein the NRF is configured to update the current key ID version value in response to adding or deleting a public key.

7. The method of claim 1, wherein the access token includes at least one key ID originating from the NRF.

8. A system for sharing key identification (key ID) and public certificate data for access token verification, the system comprising:

a network function (NF) repository function (NRF) including at least one processor and a memory; and a key identifier distribution manager (KDM) implemented by the at least one processor configured for receiving, from a producer NF, an NF registration message including key identifier (ID) version information; in response to detecting the key ID version information, sending, to the producer NF, an NF registration response message including a current key ID version value, at least one digital certificate, and at least one corresponding public key to the producer NF, wherein the current key ID version value is associated with one or more digital certificates and one or more public keys of the NRF corresponding to one or more private keys of the NRF used by the NRF to digitally sign access tokens; adding a new private key to the one or more private keys of the NRF and a new public key to the one or more public keys of the NRF, and, in response, generating an updated key ID version value;

receiving, from the producer NF, an NF update message that includes the current key ID version value; and in response to determining that the current key ID version value in the NF update message does not match the updated key ID version value maintained at the NRF, sending to the producer NF an NF update response message that includes the updated key ID version value, at least one updated digital certificate, and the new public key, wherein the new public key corresponds to the new private key and the NRF uses the new private key to digitally sign access tokens and wherein the new public key is usable by the producer NF to verify whether a digital signature of an access token received from a consumer NF requesting service was created by the NRF using the new private key.

9. The system of claim 8 wherein the current key ID version value is communicated via a first custom header section of the NF update message that includes a vendor-dynamic-key ID-version parameter.

10. The system of claim 8 wherein the at least one updated digital certificate and the new public key are communicated via a custom header section of the NF update response message that includes a vendor-dynamic-keyID-pair parameter.

11. The system of claim 8 wherein the NF update message is an NF heart-beat request message and the NF update response message is a heart-beat response message.

12. The system of claim 8 wherein in response to determining that the current key ID version value in the NF update message matches the updated key ID version value maintained at the NRF, the KDM is further configured to send an NF update response message that includes the current key ID version value.

13. The system of claim 8 wherein the NRF is configured to update the current key ID version value in response to adding or deleting a public key.

14. The system of claim 8, wherein the access token includes at least one key ID originating from the NRF.

15. One or more non-transitory computer readable media having stored thereon executable instructions that when executed by a processor of a network function (NF) repository function (NRF) control the NRF to perform steps comprising:

receiving, from a producer NF, an NF registration message including key identifier (ID) version information;

in response to detecting the key ID version information, sending, to the producer NF, an NF registration response message including a current key ID version value, at least one digital certificate, and at least one corresponding public key to the producer NF, wherein the current key ID version value is associated with one or more digital certificates and one or more public keys of the NRF corresponding to one or more private keys of the NRF used by the NRF to digitally sign access tokens;

adding, by the NRF, a new private key to the one or more private keys of the NRF and a new public key to the one or more public keys of the NRF, and, in response, generating an updated key ID version value;

receiving, from the producer NF, an NF update message that includes the current key ID version value; and in response to determining that the current key ID version value in the NF update message does not match the updated key ID version value maintained at the NRF, sending to the producer NF an NF update response message that includes the updated key ID version value, at least one updated digital certificate, the new public key, wherein the new public key corresponds to the new private key and the NRF uses the new private key to digitally sign access tokens and wherein the new public key is usable by the producer NF to verify whether a digital signature of an access token received from a consumer NF requesting service was created by the NRF using the new private key.

16. The one or more non-transitory computer readable media of claim 15 wherein the current key ID version value is communicated via a custom header section of the NF update message that includes a vendor-dynamic-keyID-version parameter.

17. The one or more non-transitory computer readable media of claim 15 wherein the at least one updated digital certificate and the new public key are communicated via a custom header section of the NF update response message that includes a vendor-dynamic-key ID-pair parameter.

18. The one or more non-transitory computer readable media of claim 15 wherein the NF update message is an NF heart-beat request message and the NF update response message is a heart-beat response message.

19. The one or more non-transitory computer readable media of claim 15 comprising, in response to determining that the current key ID version value in the NF update message matches the updated key ID version value maintained at the NRF, sending an NF update response message that includes the current key ID version value.

20. The one or more non-transitory computer readable media of claim 15 wherein the NRF is configured to update the current key ID version value in response to adding or deleting a public key.

* * * * *